Patented Mar. 13, 1951

2,544,772

UNITED STATES PATENT OFFICE 2,544,772

AQUEOUS EMULSIONS CONTAINING HYDRAZINE DERIVATIVES AS EMULSIFYING AGENTS

Ludwig F. Audrieth, Urbana, and Paul H. Mohr, Champaign, Ill., assignors to Olin Industries, Inc., East Alton, Ill., a corporation of Delaware No Drawing. Application June 4, 1947, Serial No. 752,564

13 Claims. (Cl. 252—311)

This invention relates to suspensions, emulsions, and colloidal dispersions and to the surface active agent contained therein.

One of the objects of this invention is to provide new surface active agents having utility in the preparation of suspensions, emulsions, and colloidal dispersions, all such disperse systems being referred to hereinafter as emulsions. Another object of the invention is to prepare new and useful classes of stable emulsions. Still another object is to prepare such emulsions in which organic materials, having little or no solubility in water are caused to be uniformly distributed therein in a fine state of subdivision. Another object is the provision of an emulsifying agent of comparatively low molecular weight with antioxidant characteristics.

These and other objects and advantages of this invention, which will become apparent from the following description, are accomplished in accordance with this invention by utilizing the reaction product of hydrazine, or a substituted hydrazine with one of the class of higher molecular weight long chain organic acidic compounds, either natural or synthetic in character, as emulsifying agents.

The compositions prepared in accordance with this invention are to be differentiated from those already in use or previously described by the fact that they contain, as a surface active agent, a hydrazine derivative or compound which may be represented by the general formula

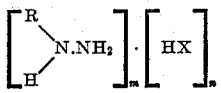

in which R represents a member of the group consisting of hydrogen, an aliphatic organic radical, a cycloaliphatic organic radical, and an aromatic organic radical, and in which HX represents an aliphatic organic compound capable of forming a salt with

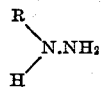

and containing a chain of 10 to 22 carbon atoms, and in which X represents a protophyllic member selected from the group consisting of carboxylated, phosphorated, and sulfurated organic radicals, and in which m and n are integers. In the foregoing formula, m will represent the integers 1 or 2 and n will represent the integer 1 for most components. However, all interacting proportions of the hydrazine and HX components are contemplated within the bounds of this invention and therefore m and n may be considered to represent integers of at least 1 and are not greater than integers representing the maximum interacting amounts of the respective components.

The HX constituents contemplated in accordance with this invention, also identifiable as the aliphatic long chain organic acids, are typified by compounds having a carboxylated radical such as stearic acid, oleic acid, lauric acid, and commercial mixtures containing the $C_{10}$—$C_{14}$ acids derivable from cocoanut oil; and by compounds having a sulfurated radical such as lauryl sulfuric acid, and mixtures containing essentially this ingredient derivable by the sulfation of commercial alcohol, or the sulfamic acids obtainable from $C_{10}$—$C_{22}$ amines or branched chain amines by the action of chlorosulfonic acid, or commercially available sulfonic acid; and by compounds having a phosphorated radical such as commercially available phosphonic or phosphinic acids. In all of these instances, hydrazine or N-substituted hydrazine will react with the proton donor to form the corresponding derivative and give the desirable effects in reducing surface tension and in exhibiting surface active characteristics.

Emulsions can be produced in accordance with this invention, for instance, either by the addition of an organic material such as an oil or wax to an aqueous solution of such a hydrazine derivative, or the hydrazine derivative may be incorporated in the organic material and subsequently added directly to water under appropriate conditions, with agitation of the mixture. It is not necessary, however, in such an instance to preform the hydrazine derivative, since the same objective may be achieved by dissolving the hydrazine base in the water and adding thereto the organic material, such as oil or other water insoluble material, to which has been added the HX constituent, as defined in the foregoing. Such hydrazine derivatives either produced initially as such, or formed in situ are capable of serving as surface active agents for effecting dispersion in water of natural and synthetic waxes, polymeric materials, mineral and animal fats and oils, and various other insoluble or relatively insoluble materials.

As is well known to those skilled in the arts a great many factors must be considered in the preparation of such emulsions, such as the temperature throughout the production cycle, extent and length of agitation and/or incorporation of the various ingredients, order of addition of the ingredients, and the type of product desired, and while the following examples are illustrative of embodiments of this invention, they should not be considered as limiting either with respect to the indicated constituents, proportions, or preparative procedure. Proportions of the various ingredients are given by parts in weight unless otherwise specified.

*Example I*

Twenty-eight and four tenths parts of stearic acid were added to eleven and seven tenths parts of 85% hydrazine hydrate dissolved in one thousand parts of water. Heating with stirring resulted in the formation of a solution containing approximately 4% by weight of a hydrazine derivative of stearic acid, i. e. dihydrazine stearate. When mixtures of equal volumes of mineral oil and of the dihydrazine stearate solution were stirred vigorously a thick, creamy emulsion was obtained.

It is to be noted that the proportions of hydrazine and stearic acid may be varied over wide mole ratios of $N_2H_4:C_{17}H_{35}COOH$ (from 4:1 to 1:4) without impairing the efficiency of the resulting aqueous solution in bringing about the emulsification of mineral oil. Thus, the presence of an amount of either component somewhat in excess of that theoretically reacting with the other component is not detrimental to the production of an emulsion. It is significant, furthermore, that stable emulsions are obtainable using aqueous solutions containing as little as 1% by weight of the hydrazine-stearic acid combination.

*Example II*

Ten parts of oleic acid and two parts of 85% hydrazine hydrate were added to five hundred parts of water and the mixture heated to 95–100° C. To the resulting solution was added slowly and with vigorous agitation ninety parts of molten paraffin wax. The resulting emulsion was allowed to cool slowly with continuous agitation to give a thick creamy product. Dilution with water did not adversely effect the stability of the emulsion. The product is easily applied to fabric surfaces, imparting water repellency thereto. When applied to fibreglass cloth it greatly increases the life of the material since it serves as a lubricant to prevent wear and abrasion of the individual fibres.

Stable disperse systems of many waxes, both natural and synthetic, may be similarly prepared, such as beeswax, carnauba and polyamides of fatty acids, octadecanoic amide and its N-substitution products.

*Example III*

An excellent emulsion of the oil in water type is obtainable by first heating together eight parts of a mixture of fatty acids derived from palm oil, eight parts of stearyl hydrazine and ninety parts of mineral oil until homogeneity is achieved and then adding this solution to an equal volume of water with constant agitation. The resulting product possesses excellent stability and may be diluted with water without separation into two phases. Presence of the hydrazine base serves to impart to the product a desirable quality as an anti-oxidant and corrosion inhibitor. Such products have been found to be exceptionally desirable in the formulation of soluble greases and cutting oils.

It is distinctly advantageous in some instances, as in the above example, to impart some organic character to the hydrazine base by replacing one of the hydrogen atoms in hydrazine by an organic radical. It should be noted that simple N-monosubstituted hydrazines such as $CH_3N_2H_3$, $C_2H_5N_2H_3$, $C_6H_5CH_2N_2H_3$, $C_6H_5N_2H_3$ and $$C_6H_{11}N_2H_3$$

i. e. hexenyl hydrazine and cyclohexyl hydrazine, can be used in place of hydrazine in the Examples I and II. These substituted hydrazines are basic in character and are appreciably water soluble and therefore are readily converted to hydrazine derivatives of the high molecular weight HX compounds specifically defined in this disclosure.

However, one of the important advantages in using hydrazine is to be found in its low molecular weight relative to its basicity; that is to say, less hydrazine as a basic constituent is needed to emulsify a given weight of wax, or oil than of any common constituent heretofore serving as an addend in the formulation of emulsions. If, however, a high molecular weight R group is attached integrally to the hydrazine base, the resulting $[RN_2H_3]_m.[HX]_n$ compound as defined by this disclosure is characterized by the fact that both the cationic and anionic portions of the molecule are active in containing a polar, hydrophyllic portion and a non-polar, organophyllic hydrophobic part—the hydrophyllic portions being soluble in and oriented in the water phase whereas the hydrophobic organic parts are oriented towards and soluble in the water-insoluble phase (the wax, oil, etc.). In Example III this objective is achieved in the formation of a mixture of the stearyl hydrazinium salts of high molecular fatty acids. Obviously, further extension of these findings to lauryl hydrazinium salts and to a wide variety of similar types of compounds is possible by those skilled in the art.

*Example IV*

Emulsions serving as carriers for insecticides are readily and easily prepared using seven parts of commercial lauric acid, two parts of methyl hydrazine and 200 parts of water to form a homogeneous, clear solution which if stirred vigorously with an equal volume of kerosene, naptha or other low boiling hydrocarbon will produce a stable emulsion which can be diluted to any desired extent with water. The hydrocarbon can be used as a solvent for insecticidal compositions and is therefore useful in the preparation of insecticidal sprays.

It would, of course, be possible to present numerous other examples in which products can be prepared for specific purposes. Emulsions, pastes and creams useful as scouring and wetting agents, textile wetting-out agents, disinfectants, lubricants, leather conditioners, leather polishes, furniture and auto polishes, waterproofing agents, cutting oils, soluble greases, insecticides, etc. can readily be produced by application of the principles herein presented. The advantages to be derived are manifold. Suffice it to say that compounds of the type $[RN_2H_3]_m.[HX]_n$ are not only efficient as emulsifiers, but due to the antioxidant character of the hydrazine grouping prevent deterioration by atmospheric agencies and thereby exert a distinct protective action where compositions contain an easily oxidizable group or where the product is used as a textile or leather conditioning or treating agent. This same tendency is furthermore to be recognized as an advantage where emulsions are used in contact with metals, where the antioxidant, surface active constituent actually serves as an inhibitor.

Having thus described the invention in detail, what we claim and desire to secure by Letters Patent is:

1. An aqueous emulsion having water as a continuous phase and water-insoluble organic material as a disperse phase and an emulsifying agent consisting of a hydrazine addition compound having the general formula $$(RN_2H_3)_m \cdot (HX)_n$$

in which R represents a member of the group consisting of hydrogen and a hydrocarbon radical; and in which HX represents an aliphatic organic acid containing a chain of 10 to 22 carbon atoms; and in which $m$ and $n$ are integers of at least one and are not greater than integers representing the maximum interacting amounts of the respective components.

2. An aqueous emulsion having water as a continuous phase and water-insoluble organic material as a disperse phase and an emulsifying agent consisting of dihydrazine stearate.

3. An aqueous emulsion as set forth in claim 1 in which the acid radical of the aliphatic organic acid is a carboxylated radical.

4. An aqueous emulsion as set forth in claim 1 in which the acid radical of the aliphatic organic acid is a sulfurated radical.

5. An aqueous emulsion having water as a continuous phase and water-insoluble organic material as a disperse phase and an emulsifying agent consisting of a hydrazine addition compound having the general formula $$(RN_2H_3)_m \cdot (HX)_n$$

in which R represents a member of the group consisting of hydrogen and a hydrocarbon radical; and in which HX represents a carboxylic acid containing a chain of 10 to 22 carbon atoms; and in which $m$ and $n$ are integers of at least one and not greater than integers representing the maximum interacting amounts of the respective components.

6. An aqueous emulsion having water as a continuous phase and water-insoluble organic material as a disperse phase and an emulsifying agent consisting of a hydrazine addition compound having the general formula $$(RN_2H_3)_m \cdot (HX)_n$$

in which R represents a member of the group consisting of hydrogen and a hydrocarbon radical; and in which HX represents stearic acid; and in which $m$ and $n$ are integers of at least one and not greater than integers representing the maximum interacting amounts of the respective components.

7. An aqueous emulsion having water as a continuous phase and water-insoluble organic material as a disperse phase and an emulsifying agent consisting of a hydrazine addition compound having the general formula $$(RN_2H_3)_m \cdot (HX)_n$$

in which R represents a member of the group consisting of hydrogen and a hydrocarbon radical; and in which HX represents oleic acid; and in which $m$ and $n$ are integers of at least one and not greater than integers representing the maximum interacting amounts of the respective components.

8. An aqueous emulsion having water as a continuous phase and water-insoluble organic material as a disperse phase and an emulsifying agent consisting of a hydrazine salt of oleic acid.

9. An aqueous emulsion having water as a continuous phase and water-insoluble organic material as a disperse phase and an emulsifying agent consisting of a hydrazine addition compound having the general formula $$(RN_2H_3)_m \cdot (HX)_n$$

in which R represents a member of the group consisting of hydrogen and a hydrocarbon radical; and in which HX represents an aliphatic organic sulphuric acid containing a chain of 10 to 22 carbon atoms; and in which $m$ and $n$ are integers of at least one and not greater than integers representing the maximum interacting amounts of the respective components.

10. An aqueous emulsion having water as a continuous phase and water-insoluble organic material as a disperse phase and an emulsifying agent consisting of a hydrazine addition compound having the general formula $$(RN_2H_3)_m \cdot (HX)_n$$

in which R represents a member of the group consisting of hydrogen and a hydrocarbon radical; and in which HX represents an alkyl sulphuric acid containing a chain of 10 to 22 carbon atoms; and in which $m$ and $n$ are integers of at least one and not greater than integers representing the maximum interacting amounts of the respective components.

11. An aqueous emulsion having water as a continuous phase and water-insoluble organic material as a disperse phase and an emulsifying agent consisting of a hydrazine addition compound having the general formula $$(RN_2H_3)_m \cdot (HX)_n$$

in which R represents a member of the group consisting of hydrogen and a hydrocarbon radical, and in which HX represents lauryl sulphuric acid; and in which $m$ and $n$ are integers of at least one and not greater than integers representing the maximum interacting amounts of the respective components.

12. An aqueous emulsion having water as a continuous phase and water-insoluble organic material as a disperse phase and an emulsifying agent consisting of a hydrazine addition compound having the general formula $$(RN_2H_3)_m \cdot (HX)_n$$

in which R represents a stearyl radical; and in which HX represents an aliphatic organic acid containing a chain of 10 to 22 carbon atoms; and in which $m$ and $n$ are integers of at least one and not greater than integers representing the maximum interacting amounts of the respective components.

13. An aqueous emulsion having water as a continuous phase and water-insoluble organic material as a disperse phase and an emulsifying agent consisting of a hydrazine addition compound having the general formula $$(RN_2H_3)_m \cdot (HX)_n$$

in which R represents a lauryl radical; and in which HX represents an aliphatic organic acid containing a chain of 10 to 22 carbon atoms; and in which $m$ and $n$ are integers of at least one and not greater than integers representing the maximum interacting amounts of the respective components.

LUDWIG F. AUDRIETH.
PAUL H. MOHR.

REFERENCES CITED

The following references are of record in the file of this patent:

UNITED STATES PATENTS

| Number | Name | Date |
|---|---|---|
| 1,266,956 | Kniffler | May 31, 1918 |
| 2,018,644 | Williams | Oct. 22, 1935 |
| 2,220,929 | Kirby | Nov. 12, 1940 |
| 2,290,870 | Flett | July 28, 1942 |
| 2,311,098 | Swan | Feb. 16, 1943 |
| 2,346,124 | Dew | Apr. 4, 1944 |
| 2,355,911 | Graenacher | Aug. 15, 1944 |
| 2,371,133 | Graenacher | Mar. 13, 1945 |

OTHER REFERENCES

Ephraim's Inorganic Chemistry, 1943, pp. 652, 653 and 658.